US007256829B2

(12) United States Patent
Kubota et al.

(10) Patent No.: US 7,256,829 B2
(45) Date of Patent: Aug. 14, 2007

(54) IMAGING APPARATUS WITH A TIMING GENERATOR HAVING A REWRITABLE STORAGE AND A METHOD OF SUPPLYING AN IMAGING DEVICE WITH DRIVE PULSES FROM THE TIMING GENERATOR

(75) Inventors: Koji Kubota, Asaka (JP); Naoki Kubo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 690 days.

(21) Appl. No.: 10/334,706

(22) Filed: Jan. 2, 2003

(65) Prior Publication Data

US 2003/0128286 A1 Jul. 10, 2003

(30) Foreign Application Priority Data

Jan. 7, 2002 (JP) ............................. 2002-000272

(51) Int. Cl.
*H04N 3/14* (2006.01)
*H04N 5/335* (2006.01)
(52) U.S. Cl. ....................................... 348/312; 348/296
(58) Field of Classification Search ................ 348/311, 348/312, 297, 298, 296; 377/52
See application file for complete search history.

(56) References Cited

U.S. PATENT DOCUMENTS

| 5,600,127 | A | 2/1997 | Kimata | |
| 6,285,399 | B1 * | 9/2001 | Tao | 348/312 |
| 6,329,982 | B1 | 12/2001 | Lee | |
| 6,593,963 | B1 * | 7/2003 | Safai | 348/222.1 |
| 6,873,366 | B2 * | 3/2005 | Tashiro et al. | 348/312 |
| 2001/0017659 | A1 | 8/2001 | Suzuki | |
| 2001/0050713 | A1 * | 12/2001 | Kubo et al. | 348/220 |

FOREIGN PATENT DOCUMENTS

| JP | 63-061560 | 3/1988 |
| JP | 8-237551 | 9/1996 |
| JP | 10-191098 | 7/1998 |
| JP | 2000-278617 A | 10/2000 |
| JP | 2000-295536 | 10/2000 |
| JP | 2001-211347 A | 8/2001 |
| JP | 2001-245218 | 9/2001 |

OTHER PUBLICATIONS

Static Random Access Memory, accessed Nov. 8, 2006, Wikipedia, http://en.wikipedia.org/wiki/Static_random_access_memory.*

* cited by examiner

*Primary Examiner*—Ngoc-Yen Vu
*Assistant Examiner*—Adam L. Henderson
(74) *Attorney, Agent, or Firm*—Birch, Stewart, Kolasch & Birch, LLP

(57) ABSTRACT

An imaging apparatus with a timing generator supplying an imaging device with drive pulses. The timing generator has registers for independently storing information required for generating a pulse pattern for the imaging device. A selector selects one of the registers to connect it to a pulse generator. Based on the information stored in the selected register, the pulse generator generates pulses of a pulse pattern for the imaging device. External control circuitry rewrites the information stored in an unselected register from the outside of the timing generator. By repeating the steps of selecting one of the registers and rewriting the information stored in the unselected register, drive pulses with various pulse patterns can be supplied to the imaging device.

23 Claims, 6 Drawing Sheets

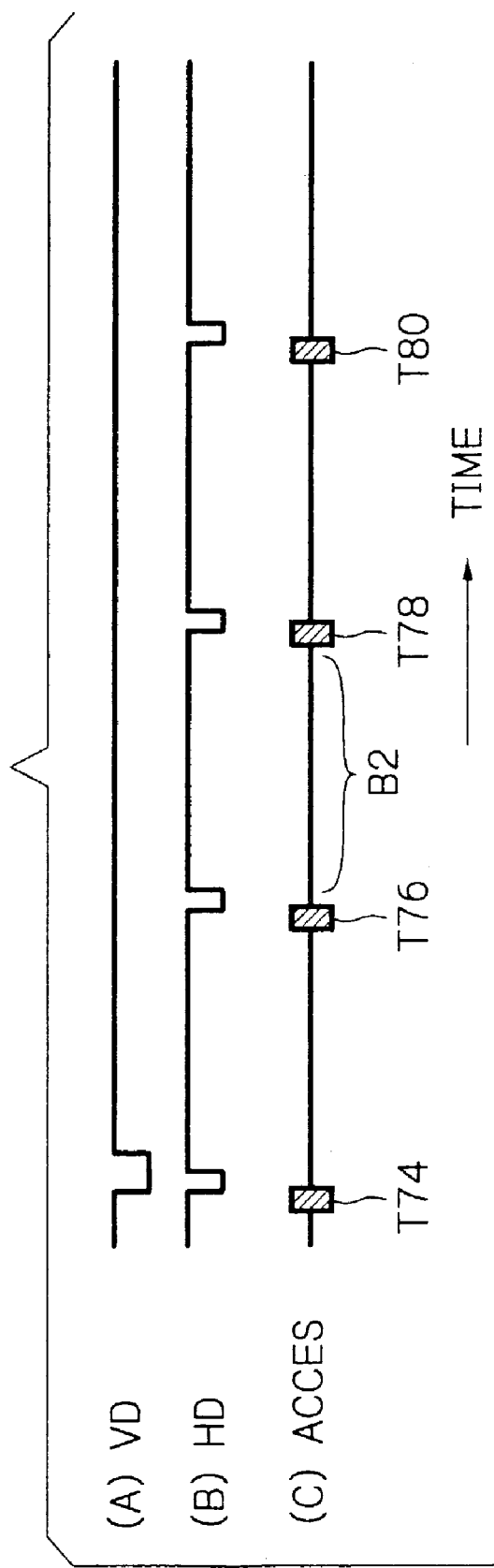

IMAGING APPARATUS WITH A TIMING GENERATOR HAVING A REWRITABLE STORAGE AND A METHOD OF SUPPLYING AN IMAGING DEVICE WITH DRIVE PULSES FROM THE TIMING GENERATOR

BACKGROUND OF THE INVENTION

1. Field of the Invention

The present invention relates to an imaging apparatus such as a digital camera, and to a method of supplying drive pulses to an imaging device.

2. Description of the Background Art

Usually, an imaging apparatus such as a digital camera includes a plurality of driving modes, such as readout mode and movie mode. An imaging device such as a CCD (Charge-Coupled Device) sensor is driven by a pattern of pulses in accordance with a driving mode. Thus, it is required of a timing generator that supplies drive pulses to the CCD sensor to select a pattern of pulses in accordance with one of the driving modes to supply the CCD sensor with drive pulses with the selected pulse pattern. As pertinent prior art, a timing pulse generator therefore is described for example in Japanese Patent Laid-Open Publication Nos. 2000-278617 and 2001-211347.

According to the prior art, a plurality of pulse patterns are collectively stored in a storage device such as SRAM (Static Random Access Memory) enclosed in the timing generator. The timing generator accesses the storage device in response to a mode selecting command from the outside of the timing generator to select a desired pulse pattern to supply the CCD sensor with drive pulses of the selected pulse pattern.

However, in the system of the prior art, since the plurality of pulse patterns needs to be stored in its entirety in the storage device enclosed in the timing generator, an integrated circuit chip carrying the large size of timing generator is required. Moreover, a digital IC (Integrated Circuit) is additionally needed to write in pulse pattern data to the storage device, whereby the IC-related cost is increased.

SUMMARY OF THE INVENTION

It is an object of the present invention to provide an imaging apparatus with a programmable timing generator having therein a storage device that is reduced in size and is rewritable from the outside of the timing generator. It is another object of the present invention to provide a method of supplying drive pulses to an imaging device by the timing generator.

In accordance with the present invention, there is provided an imaging apparatus with a timing generator supplying an imaging device with drive pulses. The timing generator has one or more registers for independently storing information required for generating a pulse pattern for the imaging device, and circuitry for generating pulses of a pulse pattern for the imaging device based on the information stored in any one of the registers. The imaging apparatus has circuitry for rewriting the information stored in the registers from the outside of the timing generator.

In accordance with the present invention, there is provided a method of supplying an imaging device with drive pulses. The method has the steps of preparing a plurality of registers storing information required for generating a pulse pattern for the imaging device inside a timing generator supplying the imaging device with drive pulses, selecting any one of the plurality of registers, generating pulses of the pulse pattern for the imaging device based on the information stored in the selected register, rewriting the information stored in the unselected register from the outside of the timing generator, and repeating a sequence of the above steps to supply the imaging device with drive pulses of various pulse patterns.

BRIEF DESCRIPTION OF THE DRAWINGS

The objects and features of the present invention will become more apparent from consideration of the following detailed description taken in conjunction with the accompanying drawings in which:

FIG. 6 is a timing chart useful for understanding the operation of the alternative embodiment shown in FIG. 5.

DESCRIPTION OF THE PREFERRED EMBODIMENTS

Figure 1:
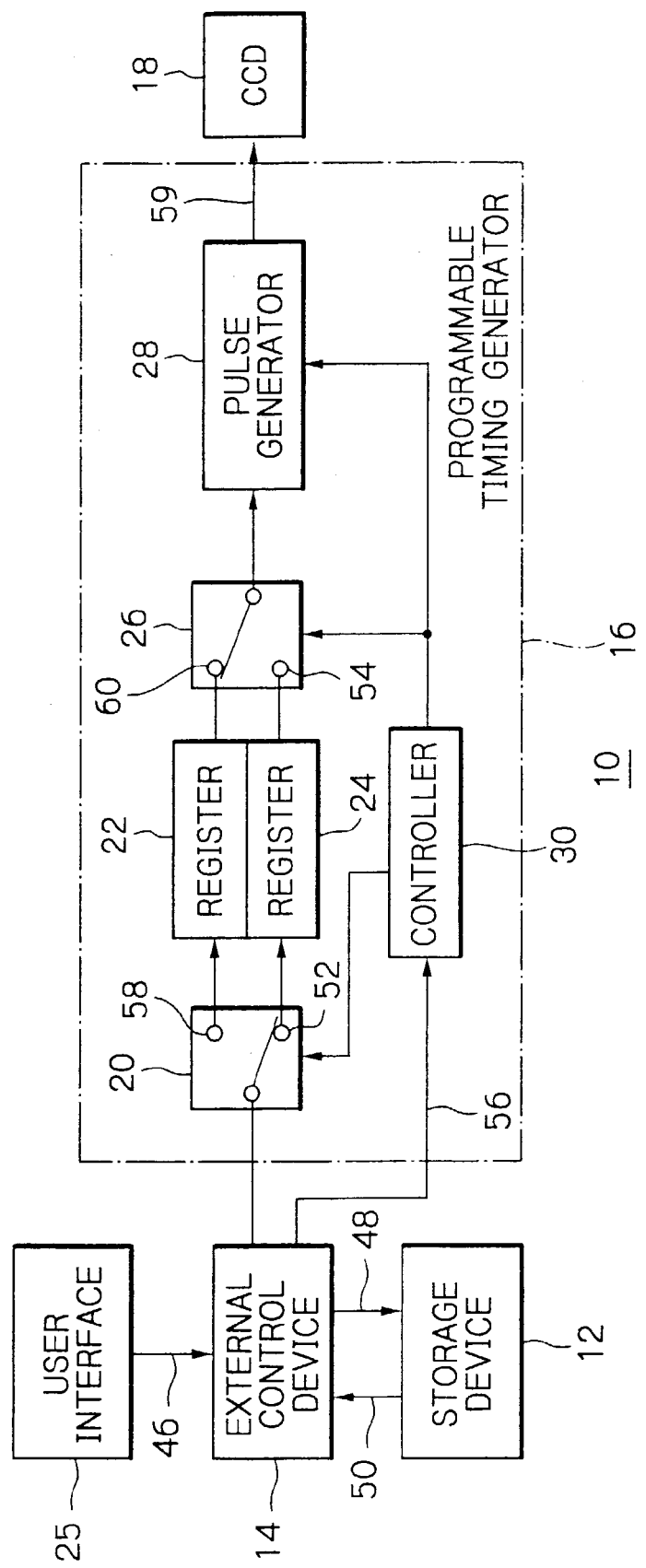
FIG. 1 is a schematic block diagram showing a preferred embodiment of an imaging apparatus in accordance with the present invention.

With reference to the accompanying drawings, preferred embodiments of an imaging apparatus according to the present invention will be described in detail. In the drawings, elements not directly related to the invention are omitted and the same reference numerals denote the like structural elements. In the description below, a signal is represented by the reference numeral of a line on which the signal is conveyed.

FIG. 1 is a block diagram showing a digital camera as an embodiment of the present invention. The digital camera 10 includes a storage device 12, an external control device 14, a programmable timing generator 16 and a CCD (Charge-Coupled Device) imaging device 18. The CCD image sensor 18 may be replaced by another type of imaging device driven by drive pulses such as a MOS (Metal Oxide Semiconductor) type imaging device.

The storage device 12 is adapted to store a plurality of units of information required for generating a pulse pattern associated with all the driving modes of the CCD sensor 18, as will be described later. In distinction from a similar device of the prior art, the storage device 12 is placed not inside the programmable timing generator 16 which will be described later, but outside the timing generator 16. This feature reduces the size of the programmable timing generator 16.

The external control device 14 is adapted to rewrite registers 22 and 24 enclosed in the programmable timing generator 16 from the outside of the timing generator 16. The control device 14 may be, for example, a microprocessor, and functions as a system controller of the camera 10. The control device 14 also controls a controller 30 enclosed in the programmable timing generator 16 to select one of the registers 22 and 24 which holds a unit of information required for generating a pulse pattern according to the current driving mode of the CCD sensor 18. When rewriting the register 22 or 24, a new unit of information is acquired by the control device 14 from the storage device 12. Then the unit of information stored presently in the register 22 or 24 is replaced with the new unit of information by the control device 14. Rewriting and selecting of the registers 22 and 24 by the control device 14 are carried out in response to operating signals 46 input by the user via a user interface 25. The user interface 25 may include a set of operating buttons or keys not shown, of the digital camera 10. The external control device 14 is operative in response to the operating signals 46 issued from the operating buttons associated with respective modes to control the programmable timing generator 16 so that the camera 10 enters a driving mode specified by the signals 46. The external control device 14 may advantageously be provided with a function of going automatically into a series of driving modes one after the other when receiving an operating signal 46 issued from specific one of the operating buttons. For example, it is advisable that, when an imaging command button is depressed, the control device 14 automatically determines that the signal received is the operating signal from the imaging command button and automatically switches the driving mode from the initial movie mode to the exposure mode and further to the readout mode. In addition, the control device 14 may also work as a controller for an image processing unit, not shown, adapted to process the image data obtained by the CCD sensor 18.

The programmable timing generator 16 is adapted to supply the CCD sensor 18 with drive pulses 59. The timing generator 16 is so structured that rewriting information stored in the enclosed registers 22 and 24 allows a pattern of drive pulses to optionally be selected. The timing generator 16 includes a selector 20 for selecting one of the registers 22 and 24 which has information to be rewritten by the external control device 14 stored, a pair of registers 22 and 24 for independently storing information required for generating a pulse pattern for the CCD sensor, and another selector 26 for selecting one of the registers 22 and 24 to read out information from the registers. In this embodiment, there are provided two registers, which are selected in alternation with each other. In addition, the number of the registers may be increased appropriately.

As stated above, the selector 20 is used for rewriting the information stored in the registers, while the selector 26 is used for reading out information from the registers. Each of the selectors 20 and 26 is thus controlled by the controller 30 to select different one of the registers so that one of the registers which is being rewritten will not be read.

The timing generator 16 also includes a pulse generator 28. The pulse generator 28 is adapted to generate pulses of a pulse pattern for the CCD sensor 18 based on information stored in the register 22 or 24 selected by the selector 26. The timing generator 16 additionally includes a controller 30. The controller 30 is adapted to control the timing of switching the selectors 20 and 26 and the timing of accessing information stored in the register 22 or 24 by the pulse generator 28, under the control of the external control device 14.

Figure 2:
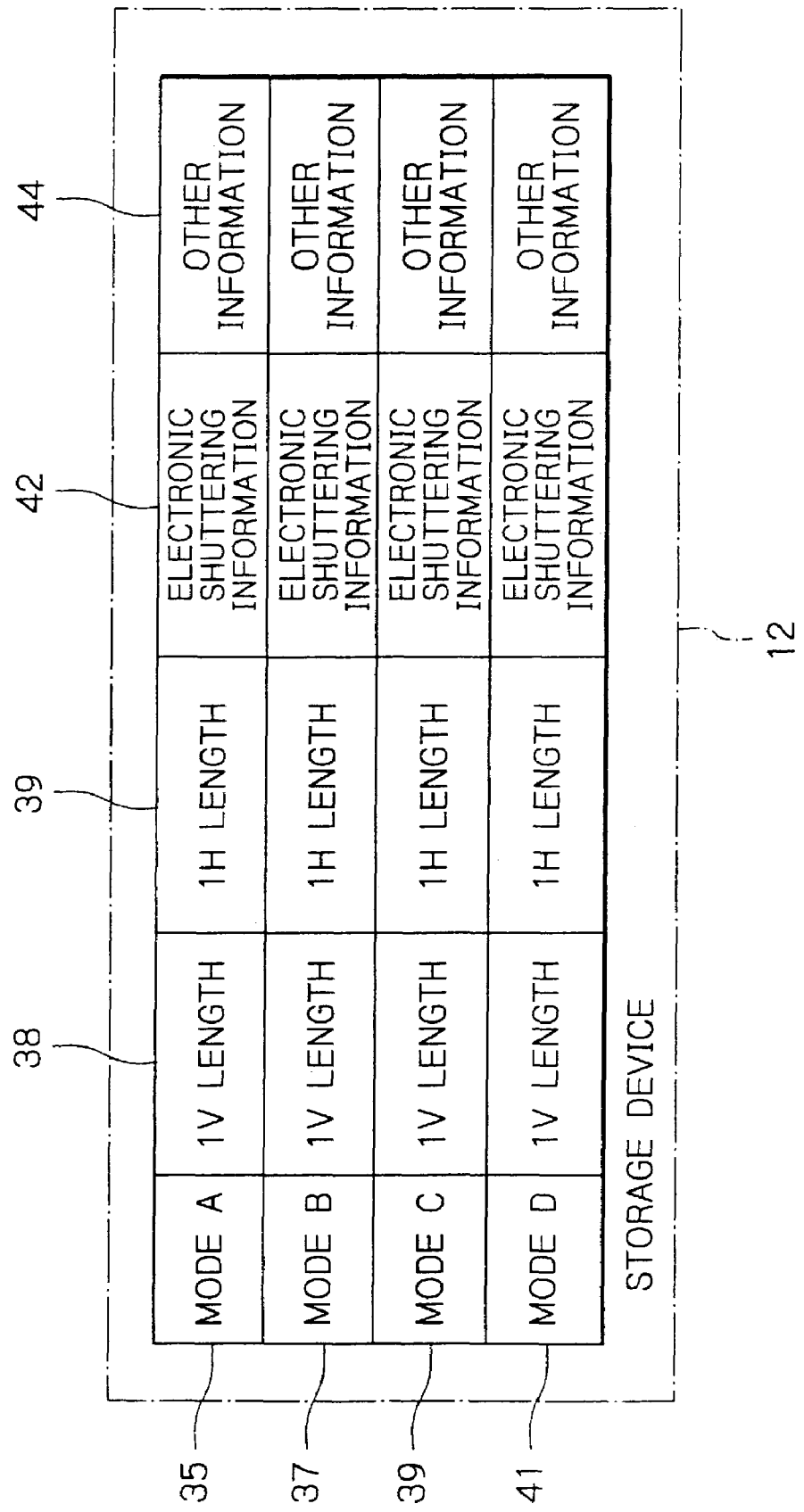
FIG. 2 is a diagrammatic view illustrating units of information required for generating a pulse pattern, stored independently in the storage device of FIG. 1.
Figure 3:
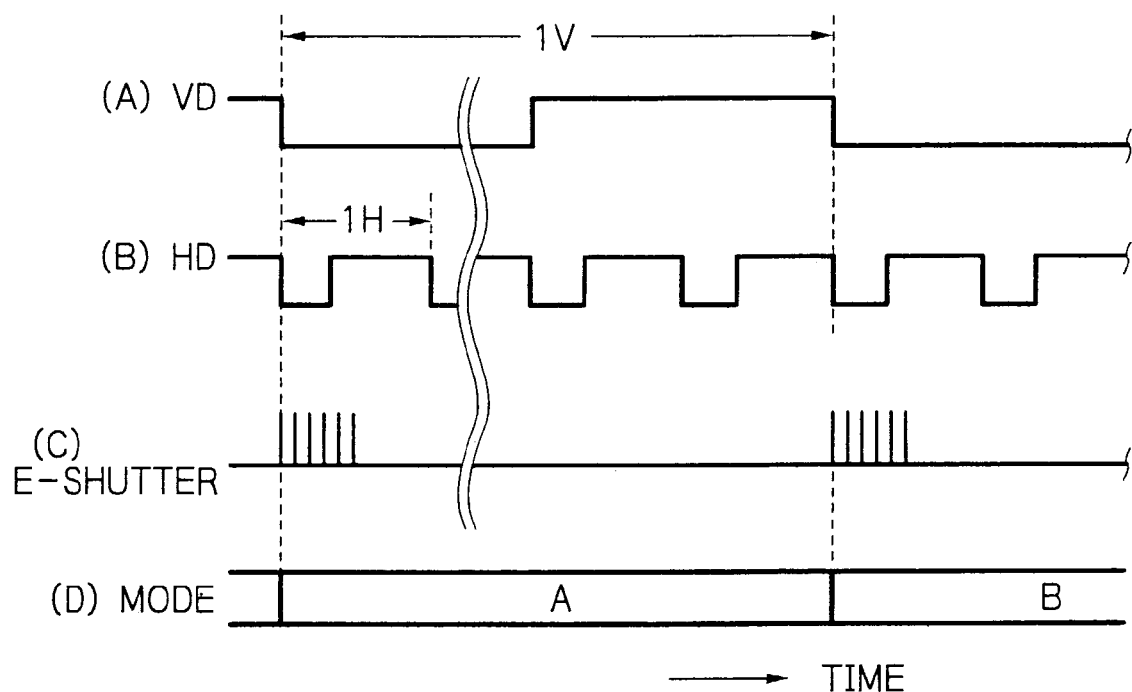
FIG. 3 is a timing chart illustrating pulses with a pulse pattern generated based on a unit of information shown in FIG. 2.

FIG. 2 shows the units of information required for generating a pulse pattern for the CCD sensor, stored in the storage device 12 and output to the registers 22 and 24 on demand. FIG. 3 is a timing chart illustrating several pulse strings defined by a pulse pattern for the CCD sensor generated based on a unit of information shown in FIG. 2. The pulse strings include vertical synchronization signal VD and horizontal synchronization signal HD shown in FIG. 3, lines (A) and (B), respectively. In the present embodiment, the storage capacity of the order of 300 bits is sufficient for each of the registers 22 and 24 to store a unit of information shown in FIG. 2. The storage capacity is about one-tenth of that of a storage device such as SRAM conventionally enclosed in the timing generator. In the following, it will be described how to supply the CCD sensor 18 with drive pulses of various pulse patterns, with reference to FIGS. 2 and 3.

As shown in FIG. 2, four units of information 35, 37, 39 and 41 required for generating a pulse pattern, associated respectively with four driving modes A to D, are stored in the storage device 12. The driving modes may, for example, be an image recording mode, a movie mode, an exposure mode, an AE (Automatic Exposure) mode and an AF (Automatic Focusing) mode. It is possible to provide additional modes other than the above ones. FIG. 2 shows only four units of information required for generating a pulse pattern associated respectively with four modes A to D for simplicity sake with the illustrative embodiment, but the camera 10 may be designed such that the number of units of information may be optionally increased or decreased according to the number of driving modes required for the camera 10.

A unit of the information required for generating a pulse pattern shown in FIG. 2 includes a record of 1V length 38 which tells a length of the vertical scanning period of the driving mode. The length 1V corresponds, as shown in FIG. 3, line (A), to one period of the vertical synchronization signal VD of the mode. A unit of the information shown in FIG. 2 includes a record of 1H length 39 which tells a length of the horizontal scanning period of the driving mode, too. The length 1H corresponds, as shown in FIG. 3, line (B), to one period of the horizontal synchronization signal HD of the mode.

FIG. 3, line (C) will be described in the following. An exposure of the photodiodes of the CCD sensor 18 starts from the beginning of each vertical scanning period 1V. At the initial stage of each vertical scanning period 1V, an operation called electronic shuttering is sometimes carried out for dumping the electrical charges accumulated in the photodiodes of the CCD sensor 18 toward the substrate, in order to save the entire exposure period of time. This operation is kept continuous for a predetermined duration. The substantial exposure starts from the end of the electronic shuttering. A record of electronic shuttering information 42 included in a unit of information required for generating a pulse pattern shown in FIG. 2 tells a duration during which the electronic shuttering is kept operated in the mode in question. FIG. 3, line (C) shows the timing of the electronic shuttering.

A record of other information 44 included in a unit of information required for generating a pulse pattern shown in FIG. 2 tells information for irregularly inverting the vertical synchronization signal VD and the horizontal synchronization signal HD shown in FIG. 3, lines (A) and (B). For example, a 1H length 39 is, in a regular case, constant during a 1V length 38 of the same driving mode but the record 44 may include information to change the 1H length 39 only during a partial duration of the 1V length 38 of the same driving mode.

FIG. 3, line (D) shows driving modes. Units of information required for generating a pulse pattern, proper to the above-described respective driving modes, are written in the registers 22 and 24. Then based on one of the units of information, a pulse pattern for the CCD sensor is generated in the pulse generator 28.

Figure 4:
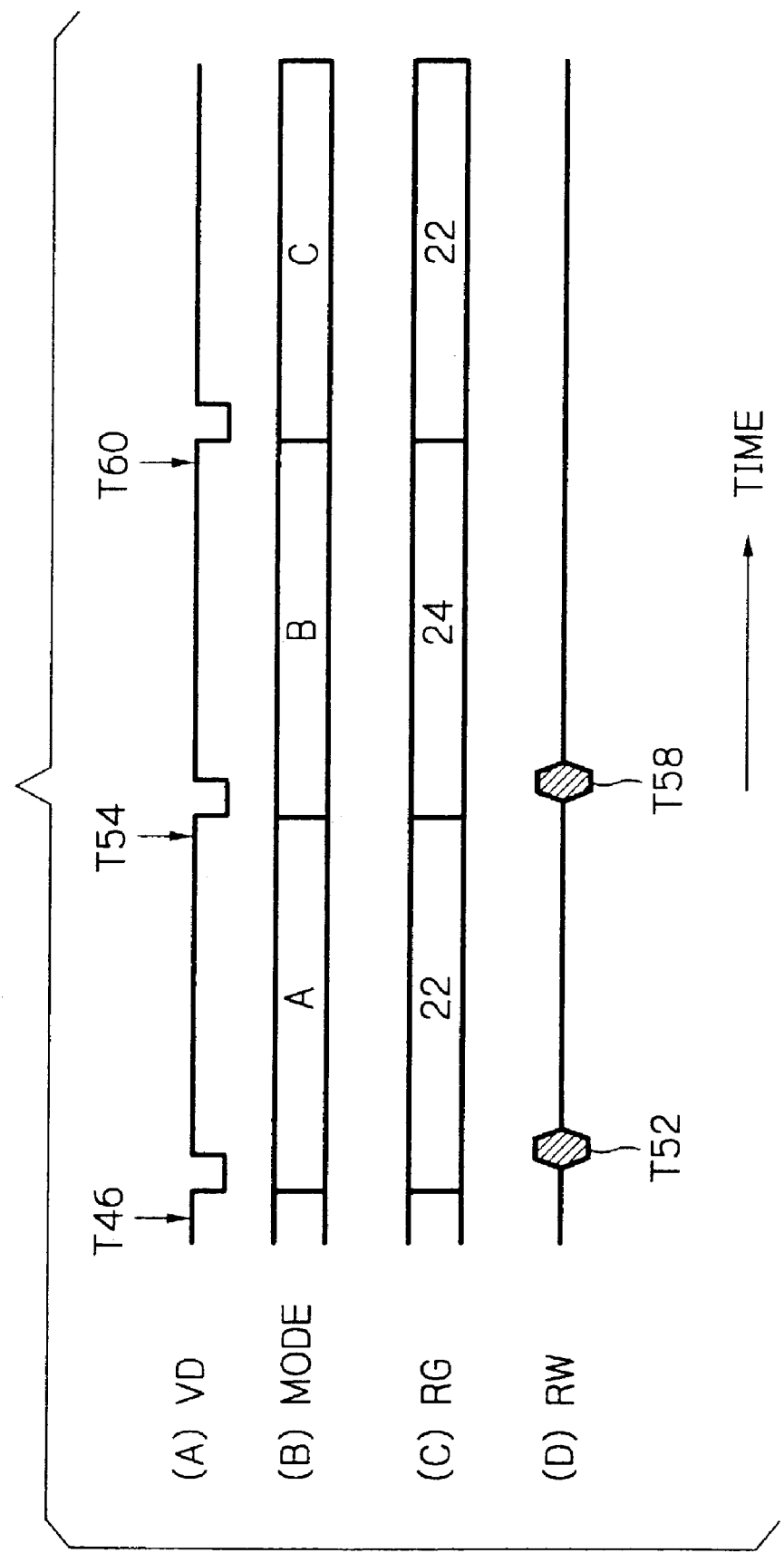
FIG. 4 is a timing chart useful for understanding the operation of the embodiment shown in FIG. 1.

Now referring to FIG. 4, line (A) shows the vertical synchronization signal VD, line (B) shows driving modes for the CCD sensor 18, line (C) shows one register selected by the selector 26, and line (D) shows the timing of rewriting information stored in the other register not selected by the selector 26. In operation, first, the external control device 14 receives input 46 issued by a user of the camera 10. Typically, the input 46 is an imaging command. It is assumed in the instant embodiment that the register 22 has been selected by the selector 26 at the timing T46 of the input 46, as shown in FIG. 4, line (C). It is therefore also assumed in the embodiment that the CCD sensor 18 has been operating in accordance with a unit of information 35 of mode A stored in the register 22. As a result of the input 46, the camera 10 now has to change its own driving mode from the current mode A to mode B, as shown in FIG. 4, line (B). More specifically, the imaging command 46 causes the control device 14 to change the driving mode, from the current movie mode A to exposure mode B.

Then the control device 14 accesses the storage device 12 via signal line 48 to acquire a unit of information 37 required for generating a pulse pattern of mode B. If the control device 14 is informed beforehand of driving mode C that comes next to mode B, another unit of information 39 required for generating a pulse pattern of mode C is simultaneously acquired by the control device 14. The units of information 37 and 39 are transferred to the control device 14 over the signal line 50. The control device 14 then writes the unit of information 37 of mode B in the register 24 which is not selected by the selector 26, via selector 20 and signal line 52. Since the selector 20 is normally controlled by the controller 30 to select one of the registers which is not selected by the other selector 26, the unit of information 37 can be written as described above via the selector 20 in the register 24 that is not selected by the selector 26 at this time point. This rewriting operation is made at for example the timing of writing T52 as depicted in FIG. 4, line (D). However, the rewriting operation can be made at any timing as long as the register 24 is selected by the selector 20.

Mode A comes to an end on the negative-going edge of a pulse of the vertical synchronization signal VD immediately after the timing of writing T52 shown in FIG. 4, line (D). Thus, at the timing T54 immediately before the end of mode A, the external control device 14 issues a command 56 to the controller 30 to switch the states of the selectors 20 and 26. As a result, the selector 26 is connected to the terminal 54 to select the register 24, while the other selector 20 is connected to the terminal 58 to select the other register 22. In this way, the unit of information 37 of mode B, stored in the register 24, is transferred to the pulse generator 28, as shown in FIG. 4, lines (B) and (C). Based on the unit of information 37, drive pulses 59 with a pulse pattern of mode C are generated. On the other hand, the unit of information 39 of mode C is written via the terminal 58 in the register 22 in place of the unit of information 35 of mode A which has so far been stored therein. This rewriting operation is made for example at the timing T58 shown in FIG. 4, line (D). At the timing T60, the selector 26 is again connected to the terminal 60 in the manner described earlier to change the driving mode from mode B to mode C.

As described above, the illustrative embodiment is characterized by writing a unit of information of next driving mode in one of the registers which does not define the current driving mode, for shifting the driving mode from current one to next.

By repeating the above-described operation, the programmable timing generator according to the illustrative embodiment can supply drive pulses 59 with various pulse patterns corresponding to all the CCD driving modes to the CCD sensor, even with a small-scale set of registers.

In the present embodiment, a pulse pattern can be partially changed by rewriting only part of a unit of information stored in the currently unselected register. For example, only the record of 1V length 38 may be rewritten in a unit of information shown in FIG. 2. By means of this method, it is possible to generate pulse patterns in accordance with a great number of driving modes, even with a small number of registers provided.

Figure 5:
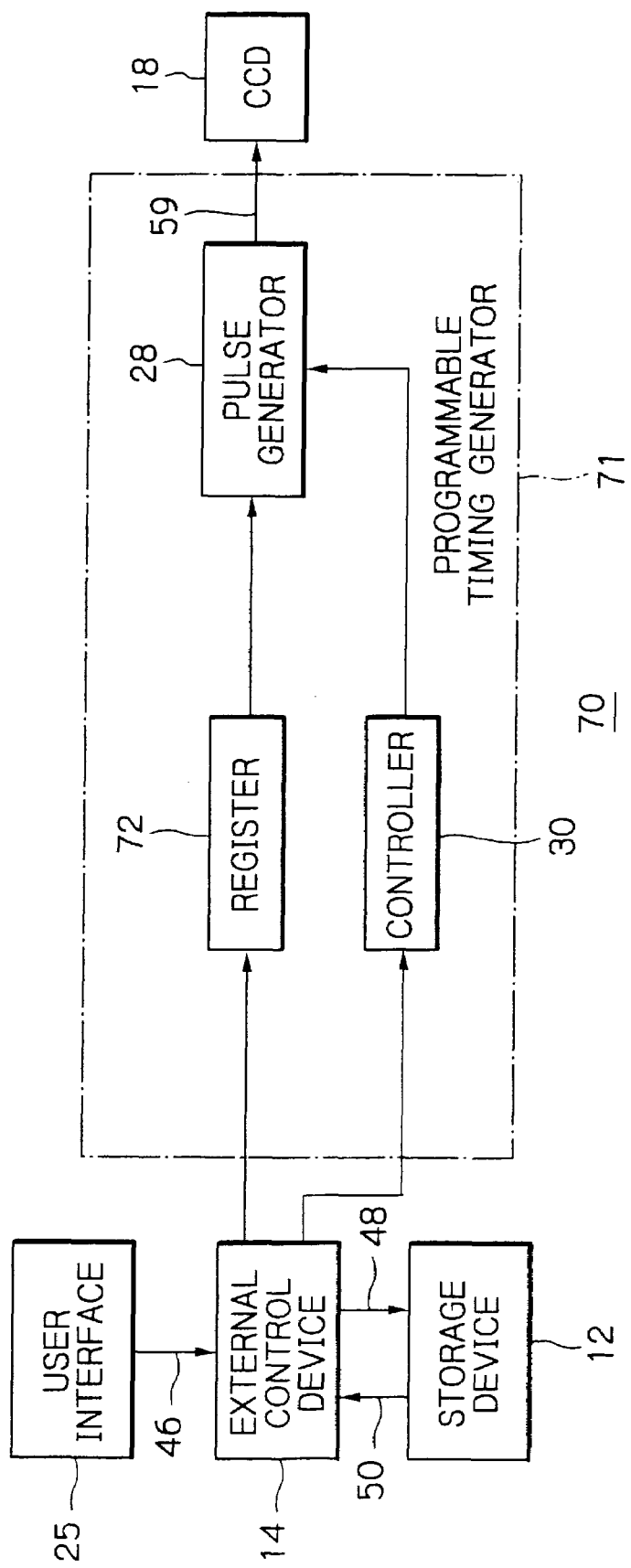
FIG. 5 is a schematic block diagram, similar to FIG. 1, showing an alternative embodiment of the invention.

Referring to FIG. 5, an alternate embodiment of the invention will be described. The digital camera 70 is similar to the embodiment shown in FIG. 1, except that the timing generator 71 has a sole register 72, and that there are provided no selector such as the selectors 20 and 26. In the case of using only one register like the alternative embodiment, the register 72 is always connected to the pulse generator 28. However, the register 72 is not always accessed by the pulse generator 28. Therefore, in the alternative embodiment a unit of information stored in the register 72 is rewritten only during a period the register 72 is not being accessed, by monitoring the timing of accessing the register 72 by the pulse generator 28. This is the characteristic of the embodiment.

Now, with reference to FIG. 6, line (A) shows the vertical synchronization signal VD, line (B) shows the horizontal synchronization signal HD and line (C) shows the timing of accessing the register 72. In this embodiment, as shown in FIG. 6, line (C), the register 72 inside the timing generator 71 is accessed at discrete timings T74, T76, T78 and T80. Those timings are synchronized with the negative-going edges of pulses of the horizontal synchronization signal HD shown in line (B). Based on units of information obtained from the register 72 at those timings, pulse patterns for the CCD sensor 18 are generated by the pulse generator 28.

Since the register 72 is accessed at the discrete timings, a unit of information stored in the register 72 can be rewritten by the external control device 14 from the outside of the timing generator 71 during for example a period 82 the register 72 is not accessed, as shown in FIG. 6, line (C). The timing of rewriting is not only limited to the period 82 but also any other period the register 72 is not accessed.

As well as the embodiment described with reference to FIG. 1, also with the alternative embodiment, a pulse pattern can be partially changed by rewriting only a part of a unit of information stored in the register 72. For example, it is possible to rewrite only the record of 1V length 38 in a unit of information stored in the register 72. It is also possible to rewrite any other record of the unit of information.

As above, the present invention is described with reference to two preferred embodiments thereof. The present invention may be, however, modified within the idea of the invention that an imaging apparatus with a timing generator has therein register(s) and that information required for generating a pulse pattern for the imaging device stored in the register(s) can be rewritten from the outside of the timing generator.

According to the present invention, a programmable timing generator supplying drive pulses with pulse patterns in accordance with various CCD driving modes is achieved using a small-capacity register, instead of using a special storage device such as SRAM. This allows the size of an IC chip carrying a timing generator to be small and lowers the IC-related cost.

In addition, the imaging apparatus with the programmable timing generator according to the invention can advantageously be constituted by ordinary digital circuits such as flip-flops.

The entire disclosure of Japanese patent application No. 2002-000272 filed on Jan. 7, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An imaging apparatus comprising a timing generator supplying an imaging device with drive pulses, said timing generator comprising:

at least one register for independently storing information required for generating a pulse pattern for said imaging device; and first circuitry for generating pulses of the pulse pattern for said imaging device based on the information stored in any one of said at least one register;

said imaging apparatus further comprising second circuitry for rewriting the information stored in said at least one register from the outside of said timing generator during a period said register is not accessed by said first circuitry; wherein said at least one register is provided in plural, said imaging apparatus further comprising a first selector for selecting any one of said registers to connect said one register selected to said first circuitry, said first circuitry generating the pulses of the pulse pattern for said imaging device based on the information stored in said one register selected by said first selector.

2. The apparatus in accordance with claim 1, further comprising a second selector for selecting any one of said registers, said second circuitry rewriting the information stored in said one register selected by said second selector.

3. The apparatus in accordance with claim 2, further comprising a control circuit controlling said first and second selectors to select different ones of said registers.

4. The apparatus in accordance with claim 3, wherein said registers are provided in pair.

5. The apparatus in accordance with claim 1, wherein said second circuitry comprises a micro-processor.

6. The apparatus in accordance with claim 1, wherein the information required for generating a pulse pattern includes a record of a length of a vertical scanning period and a record of a length of a horizontal scanning period of an image formed by said imaging device.

7. The apparatus in accordance with claim 6, wherein the information required for generating a pulse pattern further includes a record of a duration during which an electronic shuttering of said imaging device is kept operated.

8. A method of supplying an imaging device with drive pulses comprising the steps of:

preparing a plurality of registers storing information required for generating pulse patterns for the imaging device inside a timing generator supplying the imaging device with drive pulses;

selecting any one of the plurality of registers;

generating pulses of a pulse pattern for the imaging device based on the information stored in the selected register;

rewriting the information stored in one of the registers which is not selected from outside of the timing generator; and repeating sequence of said steps to supply the imaging device with the drive pulses of various pulse patterns.

9. The method in accordance with claim 8, wherein the information required for generating the pulse pattern includes a record of a length of a vertical scanning period and a record of a length of a horizontal scanning period of an image formed by the imaging device.

10. The method in accordance with claim 9, wherein the information required for generating the pulse pattern further includes a record of a duration during which an electronic shuttering of the imaging device is kept operated.

11. The method in accordance with claim 8, wherein in said step of rewriting a part of the information stored in the register which is not selected is rewritten.

12. A method of supplying an imaging device with drive pulses comprising the steps of:

storing information required for generating a pulse pattern for the imaging device in at least one register included in a timing generator supplying the imaging device with drive pulses;

obtaining the information stored in the register;

generating pulses of a pulse pattern for the imaging device based on the obtained information;

rewriting the information stored in the register from outside of the timing generator during a period the register is not accessed;

repeating a sequence of said steps to supply the imaging device with drive pulses with various pulse wave patterns;

wherein said at least one register is provided in plural, and selecting any one of said registers to connect said one register selected to a first circuitry, wherein said first circuitry generating the pulses of the pulse pattern for said imaging device based on the information stored in said selected one register.

13. The method in accordance with claim 12, wherein the information required for generating the pulse pattern includes a record of a length of a vertical scanning period and a record of a length of a horizontal scanning period of an image formed by the imaging device.

14. The method in accordance with claim 13, wherein the information required for generating the pulse pattern further includes a record of a duration during which an electronic shuttering of the imaging device is kept operated.

15. The method in accordance with claim 12, wherein in said step of rewriting a part of the information stored in the register is rewritten.

16. An imaging apparatus comprising a timing generator supplying an imaging device with drive pulses, said timing generator comprising:

a plurality of registers for storing information required for generating pulse patterns for said imaging device;

a first selector for selecting one of said plurality of registers;

a pulse generator for generating pulses of a pulse pattern for said imaging device based on the information stored in the register selected by said first selector; and an external control circuitry for rewriting the information stored in one of said plurality of registers which is not selected by said first selector.

17. The apparatus in accordance with claim 16, further comprising a second selector for selecting any one of said plurality of registers, said external control circuitry rewriting the information stored in said one register selected by said second selector.

18. The apparatus in accordance with claim 17, further comprising a control circuit controlling said first and second selectors to select different ones of said plurality of registers.

19. The apparatus in accordance with claim 18, wherein said plurality of registers are provided in pair.

20. The apparatus in accordance with claim 16, further comprising an external storage device for storing a plurality of units of information required for generating a pulse pattern for said imaging device.

21. The apparatus in accordance with claim 16, wherein said external control circuitry comprises a micro-processor.

22. The apparatus in accordance with claim 16, wherein the information required for generating a pulse pattern includes a record of a length of a vertical scanning period and a record of a length of a horizontal scanning period of an image formed by said imaging device.

23. The apparatus in accordance with claim 22, wherein the information required for generating a pulse pattern further includes a record of a duration during which an electronic shuttering of said imaging device is kept operated.

* * * * *